United States Patent [19]

Mach et al.

[11] Patent Number: 4,835,637
[45] Date of Patent: May 30, 1989

[54] DISK FILE WITH IN-HUB MOTOR

[75] Inventors: Richard E. Mach, Los Gatos; Patrick F. Merrell, San Martin, both of Calif.

[73] Assignee: International Business Machines Corporation, Armonk, N.Y.

[21] Appl. No.: 94,197

[22] Filed: Sep. 8, 1987

[51] Int. Cl.$^4$ ............................................. G11B 5/012
[52] U.S. Cl. ............................... 360/98.01; 360/98.02
[58] Field of Search ............................... 360/97.99, 106

[56] References Cited

U.S. PATENT DOCUMENTS

| | | | |
|---|---|---|---|
| 4,005,490 | 1/1977 | Duncan et al. | 360/97 |
| 4,054,931 | 10/1977 | Bolton et al. | 360/97 |
| 4,263,629 | 4/1981 | Hatch | 360/98 |
| 4,285,018 | 8/1981 | Mulvany et al. | 360/98 |
| 4,519,010 | 5/1985 | Elsaesser et al. | 360/97 |
| 4,562,499 | 12/1985 | Mizoshita | 360/98 |
| 4,607,182 | 8/1986 | Ballhaus | 310/90 |
| 4,672,487 | 6/1987 | Brand et al. | 360/97 |
| 4,698,709 | 10/1987 | Ihlenburg et al. | 360/98 X |
| 4,713,703 | 12/1987 | Asano | 360/97 |

FOREIGN PATENT DOCUMENTS 222939  5/1987  European Pat. Off. .

OTHER PUBLICATIONS

"Who Needs High Capacities", *Computer Systems* (Nov. 1983), pp. 81–84.

Primary Examiner—John H. Wolff
Attorney, Agent, or Firm—Thomas R. Berthold

[57] ABSTRACT

A compact housing 10 and disk stack subassembly for use in a data recording disk file permit the disk stack subassembly to be located entirely within and axially secured to the parallel interior walls 12, 14 of the housing 10. The disk stack subassembly includes an in-hub motor having a stator assembly 60 which is secured to a lower bearing support 42. The lower bearing support 42 is axially movable with respect to the outer race 33 of the lower bearing assembly 24. The inner race 27 of lower bearing assembly 24 is attached to the rotatable shaft 20 of the disk stack subassembly. The lower bearing support 42 and the attached stator assembly 60 are biased axially by means of disk spring 52 in the direction of the cavity 35 where the in-hub motor is located. Thus, the overall axial length of the disk stack subassembly is less than the axial distance between the parallel interior walls 12, 14 of the single piece half shell housing 10. This permits easy insertion of the completed disk stack subassembly into the housing 10 and connection thereto by means of axially aligned bolts 59, 61 which are threaded into upper bearing support 40 and lower bearing support 42. When bolts 59, 61 secure the disk stack subassembly to the walls 12, 14 of housing 10, disk spring 52 is compressed to thereby apply an axial preload to lower bearing assembly 24, which prevents axial movement of the disk stack during operation of the disk file.

4 Claims, 2 Drawing Sheets

DISK FILE WITH IN-HUB MOTOR

FIELD OF THE INVENTION

The present invention relates to data recording disk files of the type having the drive motor located within the hub which supports the disks.

BACKGROUND OF THE INVENTION

Conventional data recording disk files utilize one or more rotatable disks with concentric data tracks, one or more heads for reading or writing data onto the various tracks, and an actuator connected by a support arm assembly to the heads for moving the heads to the desired tracks and maintaining them over the track centerlines during read or write operations. The disks are mounted in a stack on a spindle, which includes a rotatable shaft, one or more bearing assemblies supporting the shaft to the disk file housing or base plate, and a hub located at the end of the shaft.

One very common form of construction for disk files is for both the actuator and disk stack spindle to be mounted on a rigid base plate. The spindle is mounted for rotation in two bearing assemblies and protrudes through the base plate to permit connection to an external drive motor. The external drive motor may be directly attached to the spindle or may be coupled by means of a belt to an external pulley attached to the spindle. Above the base plate, the spindle supports the disk stack in cantilever fashion within an enclosure which surrounds the heads and disks. A disk file having this type of construction is described in U.S. Pat. No. 4,054,931.

One problem with such a construction is that bending or vibration of the base plate or the cantilevered portion of the spindle, produced by thermal gradients or vibration sources such as the actuator and drive motor, can cause severe problems of head-to-track registration or of head-to-head registration.

The rigidity of the disk stack support structure can be improved by the use of frame or clam-shell structures which serve as the disk file housing. In such structures, the spindle is supported for rotation in bearings at both ends of the disk stack. Disk files having this type of construction are described in British Pat. No. GB 2,005,454, U.S. Pat. No. 4,285,018, and U.S. Pat. No. 4,562,499.

While achieving reductions in thermal and vibration induced misregistration, disk files with clam-shell type housings require that the spindle protrude through the wall of the housing from which the spindle is driven. This type of construction may introduce dynamic instability into the disk file. The use of spindles which protrude through the housing wall and the use of external drive means also create a potential source of contamination in the head/disk area of the disk file and add to the overall bulk of the file. Such disk files are also more difficult to assemble than the conventional base plate type of file.

The use of an "in-hub" disk drive motor in a disk file is described in U.S. Pat. No. 4,005,490. A rotating hub and single disk are supported for rotation by bearings at opposite ends of a stationary spindle. The spindle is supported by two bridge plates above and below the disk which are attached to a cylindrical frame. The frame forms a wall around the periphery of the disk. Each bridge plate also supports a set of fixed heads, as the file has no moving heads or actuators.

Another disk file employing an in-hub motor is described in European patent application No. 151,259, published Aug. 14, 1985. This disk file has a swinging arm actuator and a disk stack, both of which are supported in one half of a shell assembly. The other half of the shell assembly seals the head/disk area. The disk drive motor is a brushless DC motor embedded in the hub attached to the rotatable spindle. The spindle protrudes from the shell and is attached to the shell by insertion into cutouts in the walls of the shell.

Additional types of disk files with in-hub motors are described in U.S. Pat. Nos. 4,519,010 and 4,607,182.

In the prior designs for disk files with an in-hub motor, including that described in the cited European patent application, the entire disk stack subassembly (which comprises the spindle, the disks, and the disk drive motor) cannot be completely contained within the walls of a single piece disk file housing or the walls of one half of a shell assembly. This makes the assembly of the disk file difficult, and requires the use of numerous components to attach and seal the ends of the spindle to cutouts in the walls of the housing.

SUMMARY OF THE INVENTION

The present invention is a disk stack subassembly capable of insertion into a single piece disk file housing, whereby the bearing assemblies can be attached axially to the interior walls of the single piece housing. In particular, the disk stack subassembly includes a bearing support which is attached to one of the bearings on the rotatable spindle in a manner such that the bearing support is movable axially with respect to the outer race of the bearing but is generally rigidly secured in a radial direction to the outer race of that bearing. A biasing means in the form of a flexible disk spring forces the bearing support and the attached stator portion of the in-hub motor toward the cavity defined between the hub and spindle shaft, thereby causing the overall axial length of the disk stack subassembly to be minimized for insertion into the single piece disk file housing. When so inserted, the disk stack subassembly can be rigidly secured to the parallel interior walls of the single piece housing by axially directed bolts which pass through openings in the housing walls. When so securely attached, the bearing support is forced axially outwardly into contact with the housing wall, thereby compressing the disk spring. This results in a constant axial preload applied to this bearing, thereby preventing axial movement of the disk stack during operation of the disk file.

For a fuller understanding of the nature and advantages of the present invention reference should be made to the following detailed description taken in conjunction with the accompanying drawings.

DESCRIPTION OF THE PREFERRED EMBODIMENT

Figure 1:
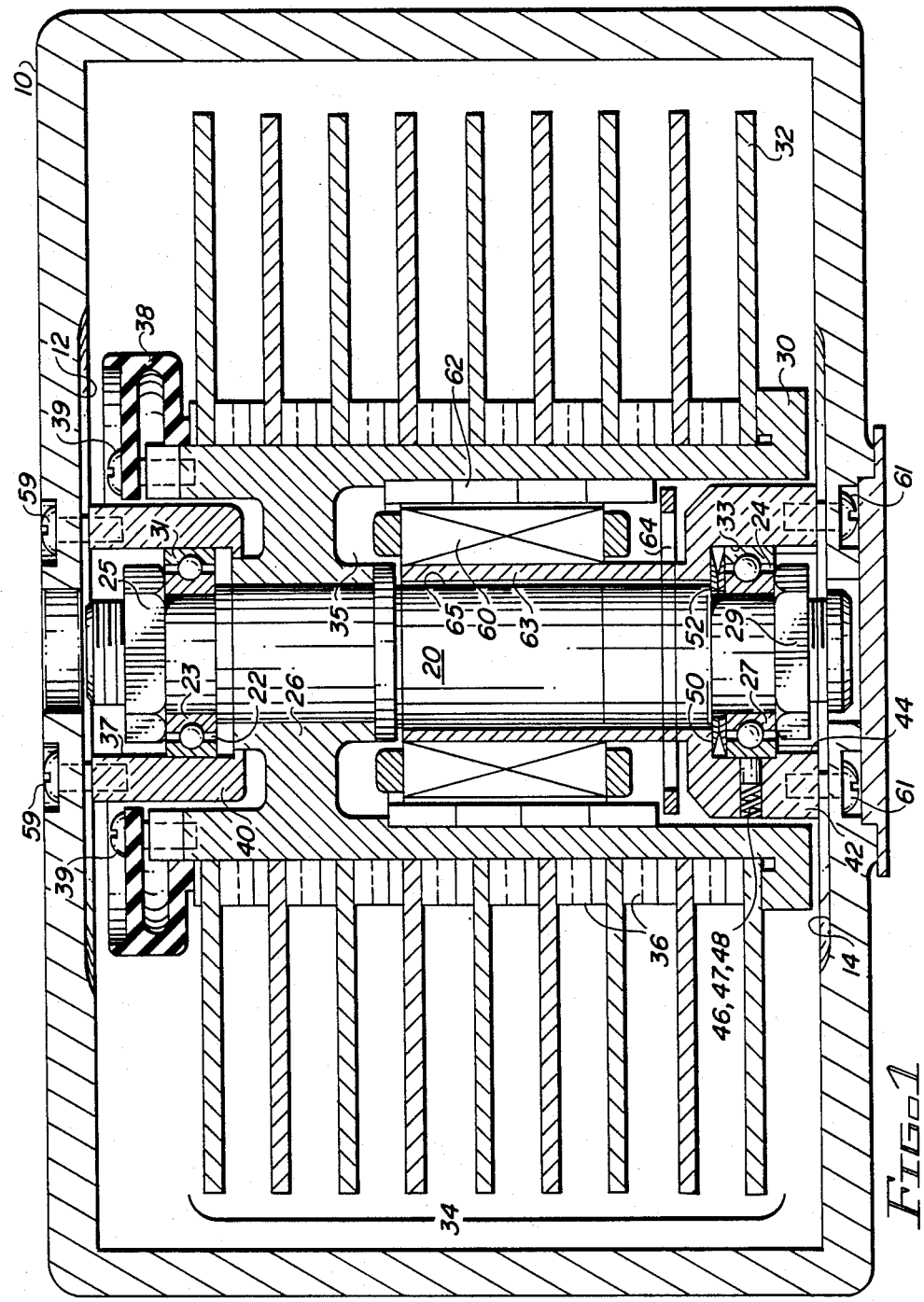
FIG. 1 is a sectional view illustrating the disk stack subassembly inserted into and axially secured to the disk file housing.

Referring first to FIG. 1, a disk file housing 10 is a portion of the complete housing for the head/disk enclosure and is a single piece casting having parallel interior walls 12, 14. When the disk file is completely assembled, face 16 is mated with and secured to a like face of a second housing portion. The two housing portions then surround and generally seal the head/disk area of the disk file.

The disk file spindle includes a rotatable shaft 20, an upper bearing assembly 22, a lower bearing assembly 24 and a hub 26. The inner race 23 of bearing assembly 22 is force fit over the upper end of shaft 20 and secured thereto by lock nut 25, and the inner race 27 of bearing assembly 24 is force fit over the lower end of shaft 20 and secured thereto by lock nut 29. The hub 26 which is attached to rotatable shaft 20 has a lower rim 30 which supports the lowermost disk 32. Hub 26 extends radially outwardly from shaft 20 so as to define a cavity 35 in the region between the shaft 20 and the radially outer portion of hub 26.

A disk stack 34 includes the lowermost disk 32 and the remaining disks supported on hub 26. Each of the disks in the disk stack 34 is separated from other disks by annular spacers 36. An axial load is applied to the disk stack 34 and spacers 36 by a disk clamp 38 which is secured to the hub by axially-directed bolts 39.

The outer race 31 of upper bearing assembly 22 is rigidly secured (e.g. by a force fit or an adhesive bond) to the inner cylindrical face 37 of upper bearing support 40. A lower bearing support 42 has an inner cylindrical face 44 which has a diameter slightly greater than the outer diameter of outer race 33 of lower bearing assembly 24. Lower bearing support 42 is thereby axially movable with respect to the outer race 33, but is preloaded radially against outer race 33 by two preload pins, one of which is shown as item 46. Preload pin 46 is forced against outer race 33 by a spring 47 which is held within bearing support 42 by means of screw 48. A similar preload pin (not shown in FIG. 1) is oriented within bearing support 42 circumferentially at a right angle from preload pin 46. Thus, the two preload pins together prevent any radial movement of bearing assembly 24 within bearing support 42.

The lower bearing support 42 has a rim 50 which is oriented in a plane generally perpendicular to the axis of rotation of shaft 20 and which extends radially outwardly from a position close to the outer diameter of shaft 20 toward the outer extent of outer race 33 of lower bearing assembly 24. Located in the region between rim 50 of bearing support 42 and outer race 33 of bearing assembly 24 is a disk spring 52 which acts to bias bearing support 42 axially upwardly relative to outer race 33.

The disk drive motor which rotates the shaft 20 and attached disk stack 34 includes a stator assembly 60 and a rotor assembly 62. The stator assembly 60, which includes the coil windings and the electrical circuitry contained on printed circuit board 64, is secured to the tubular portion 63 which forms a part of bearing support 42. An annular gap 65 exists between the outer diameter of shaft 20 and the inner diameter of tubular portion 63 so that shaft 20 may rotate freely relative to the fixed bearing support 42 and attached stator assembly 60. The disk drive motor rotor assembly 62 comprises a plurality of magnets attached to the inner wall of hub 26.

Figure 2:
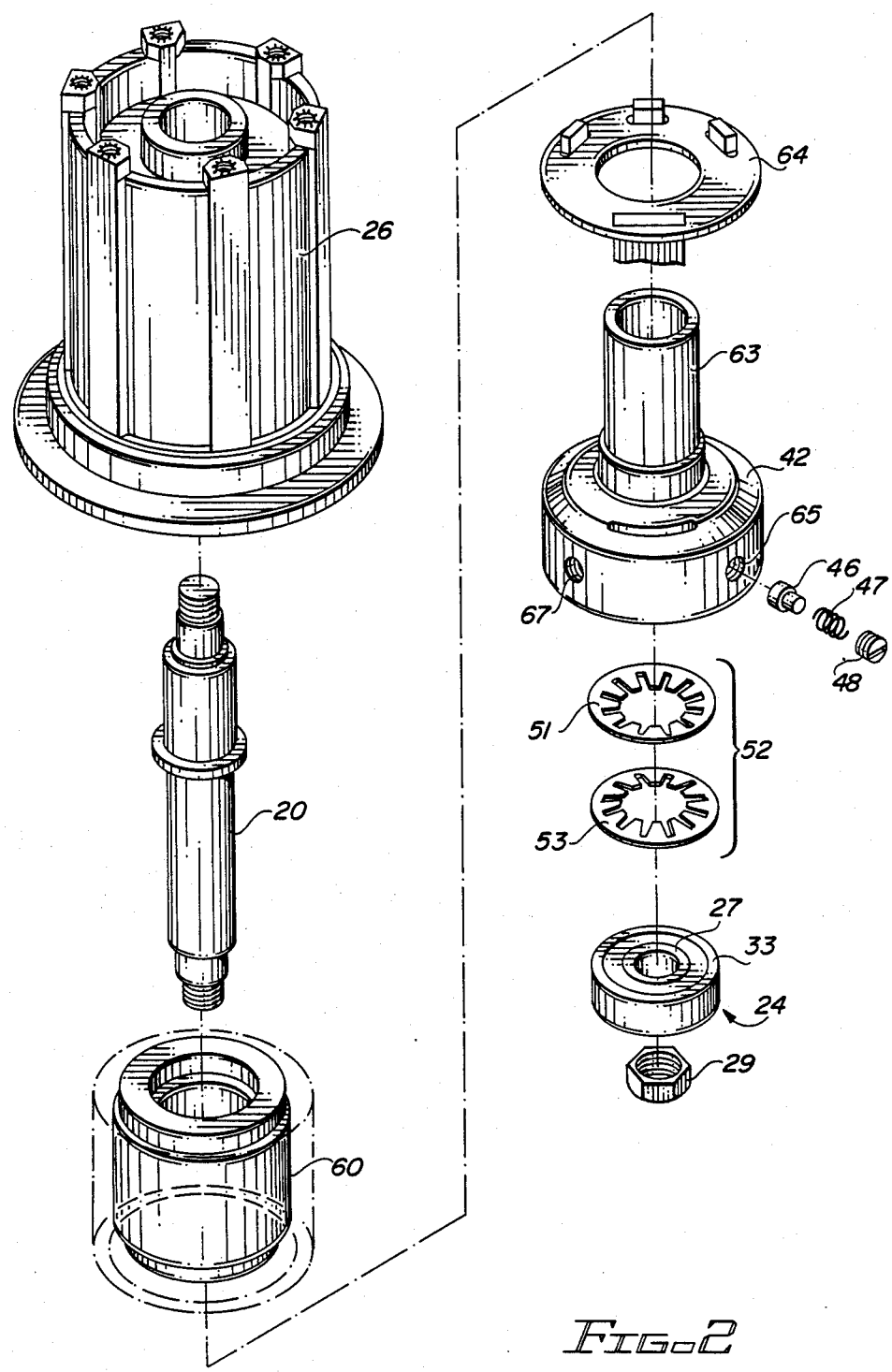
FIG. 2 is an exploded view illustrating specific components of a portion of the disk stack subassembly.

The above-described components of the disk stack subassembly can be better understood by reference to FIG. 2, which illustrates certain of the components and the manner of their assembly. The hub 26 is fitted over and secured to shaft 20. The printed circuit board 64 is attached to lower bearing support 42 and the disk drive motor stator assembly 60 (whose coil assembly is shown in phantom lines) is located over and secured to tubular portion 63 of bearing support 42. Slotted disk spring 52, which comprises two halves 51, 53, is inserted into the lower portion of bearing support 42. As shown in FIG. 1, the central openings of the disk spring halves 51, 53 are of a larger diameter than shaft 20 so that shaft 20 may rotate freely. Slotted disk spring 52 may be one of several types of commercially available springs, such as are available from Bauer Springs, Inc. in Pittsburgh, PA. Although not shown in FIG. 2, each disk spring half 51, 53 comprises two identical portions nested together.

Preload pin 46, spring 47 and screw 48 are located in a radial bore 65 in lower bearing support 42. The lower bearing assembly 24 is located within the opening defined within lower bearing support 42 and is retained therein by the two preload pins, such as typical pin 46. A like preload pin, spring and screw are located in radial bore 67 oriented ninety degrees from bore 65 in bearing support 42. A lock nut 29 is then secured to the end of shaft 20. This secures the inner race 27 of bearing assembly 24 to rotatable shaft 20.

The disk stack subassembly thus comprises shaft 20, upper and lower bearing supports 40, 42 and assemblies 22, 24, hub 26 with attached disk stack 34, and the disk drive motor which includes stator assembly 60 and rotor assembly 62. When the disk stack subassembly is completed and ready for insertion into the disk file housing 10, it has an overall axial length less than the axial distance between parallel walls 12, 14 of disk file housing 10 (FIG. 1). This reduced axial length is made possible by the manner in which the lower bearing support 42 is connected to the disk stack subassembly, in particular by disk spring 52 which is located between the outer race 33 of bearing assembly 24 and the rim 50 of the lower bearing support 42. The disk spring 52 biases lower bearing support 42 and attached stator assembly 60 axially upward in the direction of cavity 35. In this manner, the disk stack subassembly can be easily inserted between the parallel walls 12, 14 of the disk file housing 10 and precisely aligned with openings in walls 12, 14. When the disk stack subassembly is properly aligned it is then rigidly secured to the walls 12, 14 by bolts 59 which pass through openings in wall 12 and into threaded bores in upper bearing support 40, and by bolts 61 which pass through openings in the lower wall 14 and into threaded bores in lower bearing support 42. The ease of precise alignment is possible through the use of relatively simple tooling which secures the housing relative to an alignment pin which centers the spindle shaft while the bolts 59, 61 are tightened. When bolts 59, 61 are tightened the axial length of the disk stack subassembly is increased because lower bearing support 42 is moved axially relative to outer race 33 of lower bearing assembly 24 toward wall 14. This causes compression of disk spring 52, which results in a constant axial load applied to outer race 33 during operation of the disk file.

It should be apparent from the above description of the preferred embodiment of the invention that the disk file housing and disk stack subassembly are readily assembled relative to one another and securely attached to one another by means of axial connection of the bearing supports to the parallel walls of the housing. Because the ends of the spindle do not extend through openings in the walls of the housing, the disk file can be made more compact. The invention also permits the use of a more simple form of disk file housing since it is only necessary to provide holes, rather than precisely dimensioned cutouts, in the walls of a single piece casting making up the half shell housing 10.

While the preferred embodiment of the present invention has been illustrated in detail, it should be apparent that modifications and adaptations to this embodiment may occur to one skilled in the art without departing from the scope of the present invention as set forth in the following claims.

What is claimed is:

1. An apparatus for use in a data recording disk file comprising:
   a shaft;
   a pair of bearing assemblies having inner and outer races, the inner race of each bearing assembly being secured to a respective end of the shaft, thereby permitting rotation of the shaft relative to the outer races;
   a hub secured to the shaft, the hub having a generally cylindrically shaped wall extending radially outwardly from the shaft so as to define a cavity between the shaft and said wall;
   a plurality of data recording disks supported on the hub;
   a disk drive motor rotor assembly located within the cavity and secured to said wall of the hub;
   a first bearing support for one of said bearing assemblies, the bearing support having an inner cylindrical face radially located slightly beyond the outer race of said one bearing assembly so as to permit said bearing support to be axially movable with respect to the outer race of said one bearing assembly;
   means for radially loading the outer race of said one bearing assembly against the inner cylindrical face of said first bearing support so as to substantially prevent radial movement of the outer race of said one bearing assembly relative to said first bearing support;
   means located between the outer race of said one bearing assembly and said first bearing support for axially biasing said bearing support toward said cavity;
   a disk drive motor stator assembly located within said cavity and secured to said first bearing support; and
   a second bearing support rigidly secured to the outer race of the other of said bearing assemblies, the shaft with attached bearing assemblies and supports, the disk drive motor and the hub with attached disks together forming a disk stack subassembly.

2. The apparatus according to claim 1 further comprising:
   a disk file housing having two parallel interior walls spaced apart a distance slightly greater than the axial length of the disk stack subassembly as to permit the disk stack subassembly to be inserted between the parallel walls when the first bearing support attached to said one bearing assembly is biased toward said cavity; and
   means for securing the bearing supports to respective said parallel interior walls of the disk file housing, said securing means compressing said biasing means, whereby axial movement of the disk stack subassembly within the disk file housing is substantially prevented.

3. The apparatus according to claim 2 wherein each of the bearing supports has axially directed threaded bores and wherein the securing means includes a plurality of bolts inserted through openings in the interior walls of the disk file housing and into the threaded bores of said bearing supports.

4. The apparatus according to claim 1 wherein the bearing support for said one bearing assembly has a rim providing an annular face oriented generally perpendicular to the axis of rotation of the shaft and extending from substantially close to the outer diameter of said shaft to the outer race of said one bearing assembly, and wherein said biasing means includes a disk spring in contact with said rim and the outer race of said one bearing assembly.

* * * * *